G. LENGYEL.
CUSPIDOR.
APPLICATION FILED MAY 5, 1911.
1,015,694.
Patented Jan. 23, 1912.
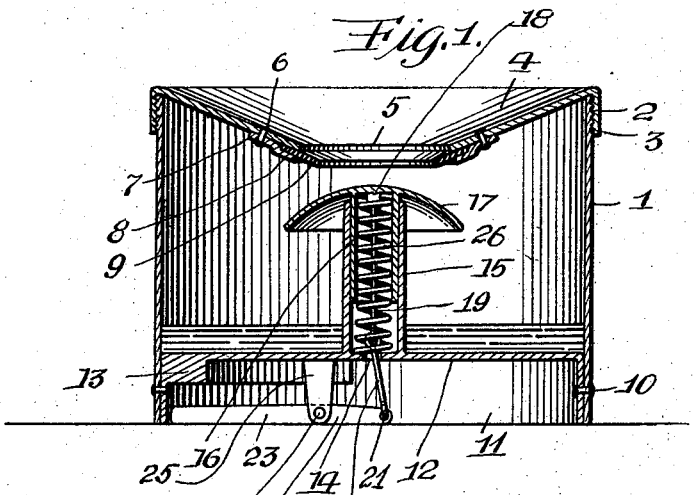
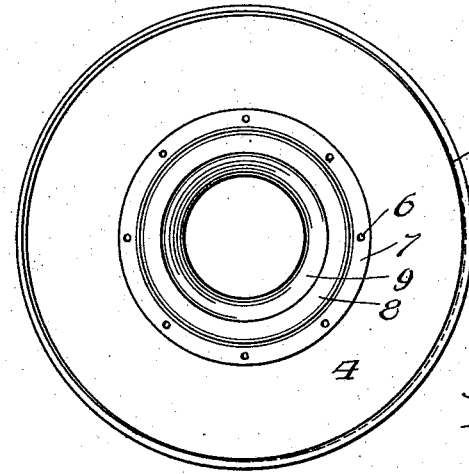
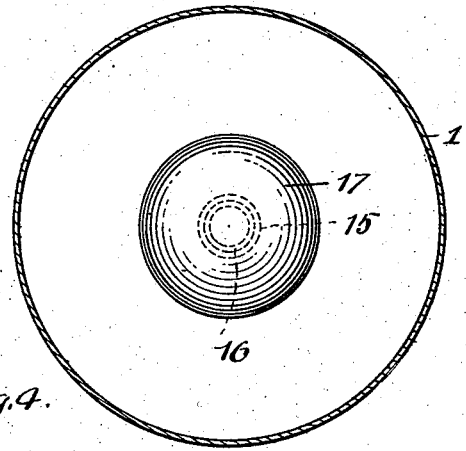
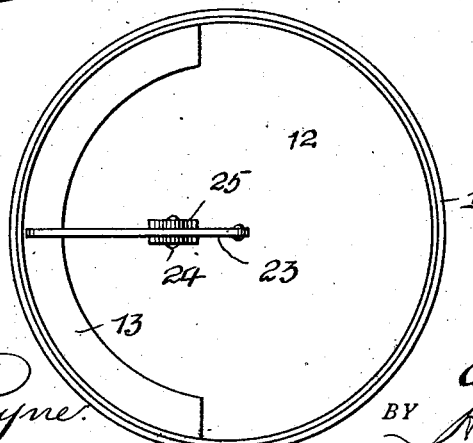
WITNESSES:
INVENTOR.
G. Lengyel.
BY
ATTORNEYS.

UNITED STATES PATENT OFFICE.

GEZA LENGYEL, OF LEDFORD, ILLINOIS.

CUSPIDOR.

1,015,694.  Specification of Letters Patent.  Patented Jan. 23, 1912.

Application filed May 5, 1911. Serial No. 625,131.

*To all whom it may concern:*

Be it known that I, GEZA LENGYEL, a subject of the King of Hungary, residing at Ledford, in the county of Saline and State of Illinios, have invented certain new and useful Improvements in Cuspidors, of which the following is a specification, reference being had therein to the accompanying drawing.

This invention relates to cuspidors, and the objects of my invention are, first, to furnish a cuspidor with a check valve that will quickly close the mouth piece of the cuspidor when the same is upset or tilted; second, to provide a cuspidor that can be easily cleaned and maintained in a sanitary condition; third, to provide a check valve for cuspidors that is positive in its action and free from injury by ordinary use, and fourth, to provide a cuspidor that is simple in construction, durable and highly efficient for the purposes for which it is intended.

I attain the above objects by a mechanical construction that will be hereinafter specifically described and then claimed.

Reference will now be had to the drawing, wherein:—

Figure 1 is a vertical sectional view of the cuspidor in accordance with this invention, Fig. 2 is a bottom plan of the mouth piece of the cuspidor, Fig. 3 is a horizontal sectional view of the cuspidor, and Fig. 4 is a bottom plan of the cuspidor.

A cuspidor in accordance with this invention comprises a cylindrical shell 1 having the upper edges thereof exteriorly screw threaded, as at 2 to receive the depending interiorly screw threaded flange 3 of a funnel-shaped mouth piece 4, said mouth piece having a central opening 5. Riveted or otherwise connected to the mouth piece 4, as at 6 is an annular holder 7 having an offset portion 8 for the edge of an annular resilient gasket 9, preferably made of rubber. The gasket 9 has the opening thereof in vertical alinement with the opening 5 and said gasket provides a seat for a valve, as will be hereinafter described.

Riveted or otherwise connected to the shell 1, as at 10 is a depending annular flange 11 of a bottom plate 12 and this bottom plate has a segment-shaped depending enlargement 13 serving functionally as a weight, for a purpose that will presently appear. The bottom plate 12 has a central opening 14 and surrounding said opening is a tubular post 15 extending in proximity to the gasket 9. Slidably mounted in the post 15 is a depending sleeve 16 of an inverted cup-shaped valve 17 adapted to engage and seat upon the gasket 9. The valve 17 has a central depending lug 18 and connected to this lug is a depending rod 19 extending into the post 15. Loosely connected to the lower end of the rod 19 is one end of a link 20 and the opposite end of said link is loosely connected, as at 21 to the short arm 22 of a lever 23. The lever 23 is fulcrumed by a pin 24 between depending bearings 25, carried by the bottom plate 12, adjacent to the enlargement or weight 13. The free end of the lever 23 is contiguous to the depending flange 11 of the bottom plate 12, and the lower edge of said lever is adapted to normally rest upon the floor or the support of the cuspidor. The lever 23 is retained in engagement with the floor or support of the cuspidor by the weight of the cuspidor and this lever retains the valve 17 in a lowered position whereby spittal or other matter can enter the cuspidor. Should the cuspidor be tilted or upset, a coiled compression spring 25 interposed between the valve 17 and the bottom plate 12 will immediately close said valve. The compression spring 26 encircles the rod 19 and has the upper convolution thereof engaging the underside of the valve 17, while the lower convolution rests upon the bottom plate 12 and surrounds the upper end of the link 20. The sleeve 16 prevents the matter within the cuspidor from entering the post 15, and when the valve 17 is closed the cuspidor is positively seated.

It is through the medium of the detachable mouth piece 4 that the interior of the cuspidor can be easily cleaned and maintained in a sanitary condition, and it is through the medium of the weighted side of the cuspidor that the lever 23 is retained upon the floor and the spring 26 under tension.

What I claim is:—

A cuspidor comprising a receptacle provided with a mouth piece, the bottom of the receptacle arranged above the lower end thereof and having a centrally disposed opening, a tubular post integral with the upper face of said bottom and surrounding said opening, a depending bearing carried by the lower face of said bottom, a lever pivoted in said bearing at a point between its center and its inner end, a link extending through said opening and having its lower end pivoted to the inner end of the lever, a sleeve extending into and projecting above said post, a valve carried by the projecting end of the sleeve and adapted to close the mouth piece when the receptacle is tilted or upset, a rod connected to the valve and pivotally connected to the upper end of the link, and a coiled spring interposed between the valve and said bottom and arranged in the post and sleeve.

In testimony whereof I affix my signature in the presence of two witnesses.

GEZA LENGYEL.

Witnesses:
EDWARD PRIOR,
THOM JUDGE.

Copies of this patent may be obtained for five cents each, by addressing the "Commissioner of Patents, Washington, D. C."